United States Patent Office 2,991,287
Patented July 4, 1961

2,991,287
11-PYRIDYL AND 11-PIPERIDYL SUBSTITUTED ETHANOANTHRACENES AND PROCESS OF PREPARING THE SAME
Frances Gertrude Fallon, Edward McCreery Roberts, and George Philip Claxton, Cincinnati, Ohio, and Edward Lewis Schumann, Kalamazoo, Mich., assignors to The Wm. S. Merrell Company, Cincinnati, Ohio, a corporation of Delaware
No Drawing. Filed Oct. 21, 1959, Ser. No. 847,702
13 Claims. (Cl. 260—290)

This invention relates to new and useful chemical compounds and to processes of preparing the same.

More particularly, this invention relates to a series of 11-pyridyl- and 11-piperidyl-cis-9,10-dihydro-9,10-endo-ethanoanthracenes, their non-toxic, water-soluble acid addition salts and quaternary ammonium derivatives. The compounds of this invention are obtained by treatment of anthracene and 9-methylanthracene with 2-vinylpyridine or 4-vinylpyridine followed, if piperidines are desired, by catalytic hydrogenation of the pyridine derivatives to give piperidines. Alkylation of these products gives N-alkyl piperidines.

The compounds of this invention may be represented by the following formulae:

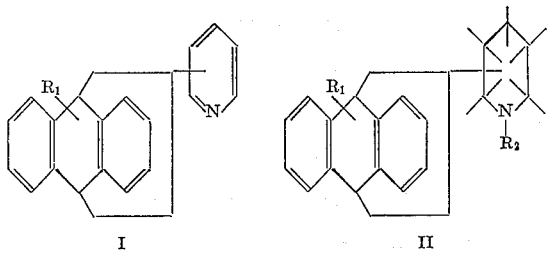

where $R_1$ is hydrogen or lower alkyl whose point of attachment is either 9- or 10-, and $R_2$ is hydrogen or lower alkyl. The heterocyclic ring is attached at either its 2- or 4-position.

The compounds have useful physiological properties being anti-inflammatory agents, and as such, are useful in the treatment of allergic and collagen diseases. Some of the compounds have good anti-histaminic and anti-muscarinic activity in vivo and in vitro as judged by their blocking effect on histamine and acetylcholine in blood pressure response in anesthetized dogs and contraction of the isolated guinea pig ileum. Because of this activity, they have use in treating allergic and anaphylactic reactions and hyperactivity of the gastrointestinal and genito-urinary systems. A clinical dose of from 25 to 2000 mg. per day for an adult by the oral route or 10 to 500 mg. parenterally is indicated. The exact dosage and route of administration will, of course, be determined by the attending physician, in view of the disease being treated, the age and condition of the patient, and other factors.

Some of the compounds of this series are diuretic agents and are indicated in the treatment of edema especially that associated with congestive heart failure. Some of the compounds also have a sex hormone potentiating activity, and as such, are useful in the treatment of periatric debilitation.

The pyridine compounds of this invention are obtained by a Diels-Alder type condensation of vinyl pyridines with anthracene or 9-methylanthracene. Equimolar amounts of the reactants are heated in an inert solvent such as p-cymene, tetralin, or decalin, with or without an acid catalyst. The piperidine compounds of this invention are obtained by the catalytic hydrogenation of the corresponding pyridines with, if desired, subsequent N-methylation with a formaldehyde-formic acid mixture.

EXAMPLE I

*11-(4-pyridyl)-cis-9,10-dihydro-9,10-endo-ethanoanthracene*

A mixture of 35.6 g. of anthracene, 21.0 g. of 4-vinylpyridine and 200 ml. of decalin was heated to reflux to effect solution and maintained at reflux for 16 hours. The hot reaction mixture was decanted from a small amount of residual tar and refrigerated. The resultant precipitate was recovered anthracene 13.2 g. (37%). This was collected by filtration and discarded. The filtrate from the anthracene recovery was extracted with dilute hydrochloric acid. The combined extracts were washed once with decalin and made alkaline with dilute sodium hydroxide. This procedure gave a gummy base which was collected in chloroform and then stripped of solvent. The black, tarry residue was extracted by being stirred with 400 ml. of boiling petroleum ether (70–90°). The extract was decanted from insoluble material and allowed to cool to room temperature. After another decantation from precipitated tar, the solution was cooled to —20° C. to give a white precipitate of 11-(4-pyridyl)-cis-9,10-dihydro-9,10-endo-ethanoanthracene, M.P. 90–92° C. The yield was 14.0 g. or 24.8% of the theoretical yield based on the starting vinylpyridine.

*Analysis.*—Calcd. for $C_{21}H_{17}N$: C, 89.00; H, 6.05; N, 4.94. Observed: C, 89.17; H, 6.18; N, 4.93.

The above described compound was prepared under a variety of conditions using various inert organic solvents such as p-cymene and tetralin and using in some cases acetic acid as a catalyst. The reaction time varied from 20 to 30 hours. However, the yields were no better than above.

This compound was found to have anti-inflammatory activity by the mustard-edema test.

EXAMPLE II

*11-(4-piperidyl)-cis-9,10-dihydro-9,10-endo-ethanoanthracene*

A solution of 20.0 g. of 11-(4-pyridyl)-cis-9,10-dihydro-endo-ethanoanthracene from Example I in 250 ml. of glacial acetic acid, in the presence of 0.5 g. of platinum oxide, was hydrogenated in a Parr shaker at 50 p.s.i. starting pressure. The theoretical amount of hydrogen was absorbed in 9–11 hours. The catalyst was removed by filtration, and the acetic acid was removed under reduced pressure. The residue was dissolved in water, made alkaline with dilute sodium hydroxide and extracted with chloroform. Solvent was removed to give the residual base which was recrystallized twice from methanol, decolorizing charcoal being used, to give 11.1 g. (54.1%) of 11-(4-piperidyl)-cis-9,10-dihydro-9,10-endo-ethanoanthracene, M.P. 161–163° C. An analytical sample was prepared by converting 10 g. of the free base in 550 ml. of 1:10 butanone-ether to the hydrochloride salt with a slight excess of 30% alcoholic hydrochloric acid. The hydrochloride was recrystallized from absolute ethanol-ether and reconverted in water with 10% sodium hydroxide, to the free base, M.P. 161–162° C.

*Analysis.*—Calcd. for $C_{21}H_{23}N$: C, 87.17; H, 8.01; N, 4.84. Observed: C, 86.89; H, 8.39; N, 4.74.

EXAMPLE III

*N-methyl-11-(4-piperidyl)-cis-9,10-dihydro-9,10-endo-ethanoanthracene and its hydrochloride*

A mixture of 28.9 g. of 11-(4-piperidyl)-cis-9,10-dihydro-9,10-endo-ethanoanthracene from Example II, 18.8 g. of 98% formic acid, 25.0 g. of formalin and 79 ml. of water was heated at reflux for 18 hours. The reaction mixture was then diluted to twice its volume with water and made strongly alkaline with 10% sodium hydroxide. The product was collected by chloroform extraction. The combined chloroform extracts were washed with water and evaporated to dryness to give 28.6 g. of crude N-methyl-11-(4-piperidyl)-cis-9,10-dihydro - 9,10 - endo-ethanoanthracene, M.P. 165–169° C. Two recrystallizations of the product from methanol-water and one from isopropanol-water gave 18.9 g. (62.0%) of purified N-methyl-11-(4-piperidyl)-cis-9,10-dihydro-9,10-endo-ethanoanthracene M.P. 168–170° C.

*Anal.*—Calcd. for $C_{22}H_{25}N$: C, 87.10; H, 8.38; N. 4.68. Observed: C, 87.06; H, 8.60; N, 4.58.

A solution of 13.0 g. of the free base in 800 ml. absolute ether was treated with excess 30% alcoholic hydrochloric acid to give 11.7 g. of the crystalline salt, M.P. 261–264° C. The crude product was recrystallized once from acetone-ether to give 9.5 g. (65%) of N-methyl-11-(4-piperidyl)-cis - 9,10 - dihydro-9,10-endo-ethanoanthracene hydrochloride, M.P. 262–263° C. An analytical sample M.P. 264–266° C., was prepared by an additional recrystallization from methanol-water and drying in vacuo at 108° C. for 24 hours.

*Analysis.*—Calcd. for $C_{22}H_{26}NCl$: C, 77.74; H, 7.71; N, 4.12. Observed: C, 77.67; H, 7.95; N, 4.04.

This compound was found to have anti-inflammatory activity when measured by the mustard-edema and the dextran-edema tests. It also was found to have antispasmodic and anti-histaminic activity.

EXAMPLE IV

*11-(2-pyridyl) - cis - 9,10 - dihydro-9,10-endo-ethanoanthracene and its hydrochloride*

According to the procedure of Example I, 21.0 g. of 2-vinylpyridine being used in place of 4-vinylpyridine, p-cymene being used as solvent in place of decalin, and reaction being allowed to proceed 20 hours instead of 16, anthracene was converted to 11-(2-pyridyl)-cis-9,10-dihydro-9,10-endo-ethanoanthracene. Tar formation was less in this case than that of Example I, so that repeated decantations of petroleum ether solutions from tar were unnecessary. The crude product was recrystallized twice from petroleum ether with decolorizing charcoal to give 17.7 g. (31%) of the analytically pure product, M.P. 120–122° C.

*Analysis.*—Calcd. for $C_{21}H_{17}N$: C, 89.00; H, 6.05; N, 4.94. Observed: C, 88.98; H, 6.13; N, 4.96.

A solution of 4.0 g. of the free base in absolute ether solution was treated with excess 30% alcoholic hydrochloric acid to give 4.26 g. of crystalline 11-(2-pyridyl)-cis - 9,10-dihydro-9,10-endo-ethanoanthracene hydrochloride, M.P. 222–225° C. after drying in vacuo for 4 hours at 108° C.

The product of this example had anti-inflammatory activity as measured by the dextran-edema test. It was also found to be a sex hormone potentiating agent.

EXAMPLE V

*11-(2-pyridyl) - cis - 9,10 - dihydro-9,10-endo-ethanoanthracene methiodide*

A solution of 28.3 g. of 11-(2-pyridyl)-cis-9,10-dihydro-9,10-endo-ethanoanthracene from Example IV, and 28.2 g. of methyl iodide in 200 ml. of chloroform was placed in two pressure bottles and heated for 7 hours at 100 °C. The mixtures of solid and solution in the bottles were combined, evaporated, and washed with dry ether and filtered. Recrystallization from 5 liters of boiling water gave 29.6 g. (68.2%) of 11-(2-pyridyl)-cis-9,10-dihydro-9,10-endo-ethanoanthracene methiodide as the hemihydrate, M.P. 266–267° C. An analytical sample was dried overnight in vacuo at 100° C. to give the anhydrous product, M.P. unchanged.

*Analysis.*—Calcd. for $C_{22}H_{20}NI$: C, 62.13; H, 4.74; N, 3.29. Observed: C, 61.95; H, 4.58; N, 2.90.

This compound has anti-inflammatory activity in the dextran-edema test.

EXAMPLE VI

*11-(2-piperidyl)-cis-9,10-dihydro-9,10-endo-ethanoanthracene*

According to the procedure of Example II, an identical amount of 11-(2-pyridyl)-cis - 9,10 - dihydro-9,10-endo-ethanoanthracene being used in place of the 4-pyridyl derivative of that example, 11-(2-pyridyl)-cis-9,10-dihydro-9,10-endo-ethanoanthracene was converted to 11-(2-piperidyl)-cis-9,10-dihydro - 9,10 - endo-ethanoanthracene, M.P. 164–166° C. from methanol-water, weight 15.3 g. (75%). Two recrystallizations from methanol-water with decolorizing charcoal gave an analytically pure sample in this case; additional purification by means of the hydrochloride salt as in Example II was unnecessary here.

*Analysis.*—Calcd. for $C_{21}H_{23}N$: C, 87.16; H, 8.01; N, 4.84. Observed: C, 87.46; H, 8.29; N, 4.77.

The compound had anti-inflammatory activity when measured by both the mustard-edema and dextran-edema tests.

EXAMPLE VII

*N-methyl-11-(2-piperidyl)-cis-9,10-dihydro-9,10-endo-ethanoanthracene*

According to the procedure of Example III, an identical amount of 11-(2-piperidyl)-cis-9,10-dihydro-9,10-endo-ethanoanthracene being used in place of the 4-piperidyl derivative of Example III, 11-(2-piperidyl)-cis-9,10-dihydro-9,10-endo-ethanoanthracene was converted to N-methyl-11-(2-piperidyl)-cis-9,10-dihydro-9,10-endo-ethanoanthracene, M.P. 110–112° C., weight 15.3 g. (85%). Two recrystallizations from methanol-water gave an analytically pure sample in this case; additional recrystallization from isopropanol-water as in Example III was unnecessary here.

*Analysis.*—Calcd. for $C_{22}H_{25}N$: C, 87.10; H, 8.31; N, 4.62. Observed: C, 87.12; H, 8.63; N, 4.32.

This compound has diuretic activity.

EXAMPLE VIII

*9(or 10)-methyl-11-(2-pyridyl)-cis-9,10-dihydro-9,10-endo-ethanoanthracene*

According to the procedure of Example I, an equivalent amount of 9-methylanthracene being used in place of anthracene, an identical amount of 2-vinylpyridine being used in place of 4-vinylpyridine, and 500 ml. of p-cymene being used in place of decalin, 9-methylanthracene was converted to 9(or 10) - methyl - 11 - (2-pyridyl) - cis - 9,10 - dihydro - 9,10 - endo - ethanoanthracene. Tar formation was less in this case than that of Example I, so that repeated decantations of petroleum ether solutions from tar were unnecessary. The crude product was recrystallized twice from petroleum ether with decolorizing charcoal to give 20.2 g. (35%) of the analytically pure product, M.P. 141–143° C.

*Analysis.*—Calcd for $C_{22}H_{19}N$: C, 88.84; H, 6.44; N, 4.71. Observed: C, 88.89; H, 6.80; N, 4.62.

EXAMPLE IX

*N-methyl-11-(2-piperidyl)-cis-9,10-dihydro-9,10-endo-ethanoanthracene methiodide*

A solution of 3.0 g. of N-methyl-11-(2-piperidyl)-cis-9,10-dihydro-9,10-endo-ethanoanthracene (Example VII) in 20 ml. of chloroform was treated with excess methyl iodide. After standing 1 hour at room temperature, the reaction solution was diluted to 100 ml. with absolute ether to give an immediate precipitate. The reaction mixture was allowed to stand overnight at room temperature. Filtration yielded 4.26 g. of hygroscopic salt which was immediately recrystallized from acetone to give 1.63 g. of lustrous light-gray crystals, N-methyl-11-(2-piperidyl - cis - 9,10 - dihydro - 9,10 - endo - ethanoanthracene methiodide, M.P. 179–181° C., after drying 6 hours at 100° C. in vacuo.

*Analysis.*—Calcd. for $C_{23}H_{28}NI$: C, 62.02; H, 6.34; N, 3.14. Observed: C, 61.81; H, 6.69; N, 2.78.

We claim:
1. A compound of the group consisting of those having the formula:

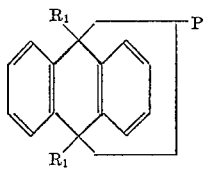

wherein $R_1$ is a member of the group consisting of hydrogen and lower alkyl, and P is a member of the group consisting of pyridyl, piperidyl and N-lower alkyl piperidyl.

2. 11 - (4 - pyridyl) - cis-9,10 - dihydro - 9,19 - endo-ethanoanthracene.

3. 11 - (4 - piperidyl) - cis - 9,10 - dihydro - 9,10-endo-ethanoanthracene.

4. N - methyl - 11 - (4 - piperidyl) - cis - 9,10 - dihydro - 9,10 - endo - ethanoanthracene.

5. 11 - (2 - pyridyl) - cis - 9,10 - dihydro - 9,10 - endo-ethanoanthracene.

6. 11 - (2 - pyridyl) - cis - 9,10 - dihydro - 9,10 - endo-ethanoanthracene methiodide.

7. 11 - (2 - piperidyl) - cis - 9,10 - dihydro - 9,10-endo - ethanoanthracene.

8. N - methyl - 11 - (2 - piperidyl) - cis - 9,10 - dihydro - 9,10 - endo - ethanoanthracene.

9. 9 - methyl - 11 - (2-pyridyl)-cis-9,10-dihydro-9,10-endo-ethanoanthracene.

10. N-methyl - 11-(2-piperidyl)-cis-9,10-dihydro-9,10-endo-ethanoanthracene methiodide.

11. A process of preparing compounds having the formula:

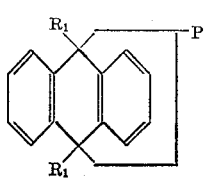

wherein at least one of the $R_1$ radicals is a member of the group consisting of hydrogen and lower alkyl and P is c-pyridyl which comprises heating a member of the group consisting of anthracene and 9-lower alkylanthracenes with a vinylpyridine of the group consisting of 2-vinylpyridine and 4-vinylpyridine in an inert organic solvent.

12. A method of preparing compounds of the formula:

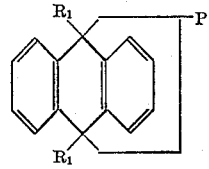

wherein at least one of the $R_1$ radicals is a member of the group consisting of hydrogen and lower alkyl and P is c-piperidyl which comprises the steps of heating a member of the group consisting of anthracene and 9-lower alkylanthracenes with a vinylpyridine of the group consisting of 2-vinylpyridine and 4-vinylpyridine in an inert organic solvent and thereafter subjecting the resulting pyridine derivative to hydrogenation in glacial acetic acid in the presence of platinum oxide as a catalyst.

13. A method of preparing compounds having the formula:

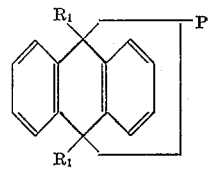

wherein at least one of the $R_1$ radicals is a member of the group consisting of hydrogen and lower alkyl and P is a member of the group consisting of N-lower alkyl-piperidyl which comprises heating a member of the group consisting of anthracene and 9-lower alkylanthracenes with a vinylpyridine of the group consisting of 2-vinylpyridine and 4-vinylpyridine in an inert organic solvent, subjecting the resulting pyridine to catalytic hydrogenation in glacial acetic acid in the presence of platinum oxide as a catalyst and thereafter treating the piperidine product with an N-alkylating agent.

No references cited.